US010576600B2

United States Patent
Lee et al.

(10) Patent No.: US 10,576,600 B2
(45) Date of Patent: Mar. 3, 2020

(54) APPARATUS FOR PROCESSING EDGE OF EYEGLASS LENS

(71) Applicant: HUVITZ CO., LTD., Gyeonggi-do (KR)

(72) Inventors: Hyun Chul Lee, Seoul (KR); Seung Suk Ha, Gyeonggi-do (KR)

(73) Assignee: HUVITZ CO., LTD., Gyeonggi-Do (KR)

( * ) Notice: Subject to any disclaimer, the term of this patent is extended or adjusted under 35 U.S.C. 154(b) by 116 days.

(21) Appl. No.: 15/642,733

(22) Filed: Jul. 6, 2017

(65) Prior Publication Data

US 2018/0169821 A1    Jun. 21, 2018

(30) Foreign Application Priority Data

Dec. 20, 2016   (KR) .......................... 10-2016-0174942
Dec. 20, 2016   (KR) .......................... 10-2016-0174943

(51) Int. Cl.
*B24B 9/14*     (2006.01)
*B24B 27/00*    (2006.01)
(Continued)

(52) U.S. Cl.
CPC ................ *B24B 9/14* (2013.01); *B24B 9/148* (2013.01); *B24B 27/0076* (2013.01);
(Continued)

(58) Field of Classification Search
CPC ....... B24B 9/14; B24B 9/148; B24B 27/0076; B24B 27/0084; B24B 13/00;
(Continued)

(56) References Cited

U.S. PATENT DOCUMENTS 5,105,584 A * 4/1992 Gray ....................... B24B 45/00
                                                           451/22
5,371,974 A * 12/1994 Lecerf .................. B24B 47/225
                                                           451/240
(Continued)

FOREIGN PATENT DOCUMENTS

KR  10-2006-0054560 A  5/2006
KR  10-2014-0053572 A  5/2014

OTHER PUBLICATIONS

HPE-8000X Homepage; http://www.huvitz.com/oph_eng/product/p_HPE-8000X.html; Huvitz; Gyeonggi-do, Republic of Korea; 2008.
(Continued)

*Primary Examiner* — Timothy V Eley
(74) *Attorney, Agent, or Firm* — Nath, Goldberg & Meyer; Tanya E. Harkins; Joshua B. Goldberg

(57) ABSTRACT

Disclosed is an apparatus for processing a lens edge. The apparatus comprises: a wheel-shaft-moving rotating member whose one end is fixed to a fixing frame by a moving-shaft, for moving pivotally about the moving-shaft; a wheel-shaft mounted on the other end of the wheel-shaft-moving rotating member, for moving pivotally with the wheel-shaft-moving rotating member and for being rotated by driving a wheel-rotating motor; and a cutter for processing the lens edge into a form of a step/incline shape, the cutter being coupled to one end of the wheel shaft to move with the wheel-shaft to contact the lens edge, and rotated with the wheel shaft to cut the surface of the lens, and the cutter comprising a rotating body inserted into the wheel-shaft to rotate with the wheel-shaft, and at least one cutting projection formed on the circumference of the rotating body to cut the edge and the periphery of the lens.

5 Claims, 5 Drawing Sheets

(51) Int. Cl.
 B24B 13/00 (2006.01)
 B29D 11/00 (2006.01)
(52) U.S. Cl.
 CPC .... B24B 27/0084 (2013.01); B29D 11/00932 (2013.01); B29D 11/00942 (2013.01); B24B 13/0037 (2013.01)
(58) Field of Classification Search
 CPC . B24B 13/003; B24B 13/0037; B24B 13/043; B24B 13/0046; B24B 25/00; B24B 41/04; B29D 11/00932; B29D 11/00942
 See application file for complete search history.

(56) References Cited

U.S. PATENT DOCUMENTS

| | | | | |
|---|---|---|---|---|
| 5,951,378 | A * | 9/1999 | Miller | B24B 15/02 451/461 |
| 5,957,637 | A * | 9/1999 | Savoie | B24B 13/043 409/132 |
| 6,478,657 | B1 * | 11/2002 | Shibata | B24B 9/148 451/255 |
| 6,719,609 | B2 * | 4/2004 | Mizuno | B24B 9/148 451/10 |
| 7,220,162 | B2 * | 5/2007 | Tanaka | B24B 9/148 451/5 |
| 7,281,967 | B2 * | 10/2007 | Meunier | B24B 9/14 451/255 |
| 7,410,408 | B2 * | 8/2008 | Shibata | B24B 19/03 451/43 |
| 7,476,143 | B2 * | 1/2009 | Shibata | B24B 9/14 451/10 |
| 7,540,798 | B2 * | 6/2009 | Shibata | B23C 3/04 451/225 |
| 8,167,680 | B2 * | 5/2012 | Nauche | B24B 9/14 445/43 |
| 8,801,503 | B2 * | 8/2014 | Hackman | B23F 21/22 451/48 |
| 9,248,541 | B2 * | 2/2016 | Videcoq | B24B 9/14 |

OTHER PUBLICATIONS

Pelc, Corrie "A Look Back at Vision Expo 2016"; Sep. 23, 2016; http://www.optometryweb.com/Featured-Articles/191730-A-Look-Back-at-Vision-Expo-2016.html; Optomertry Web: The Ultimate Online Resource for Optometrists.
Kaizerx Catalog; Huvitz; www.huvitz.com; Aug. 26, 2016.

\* cited by examiner

[Figure 1]
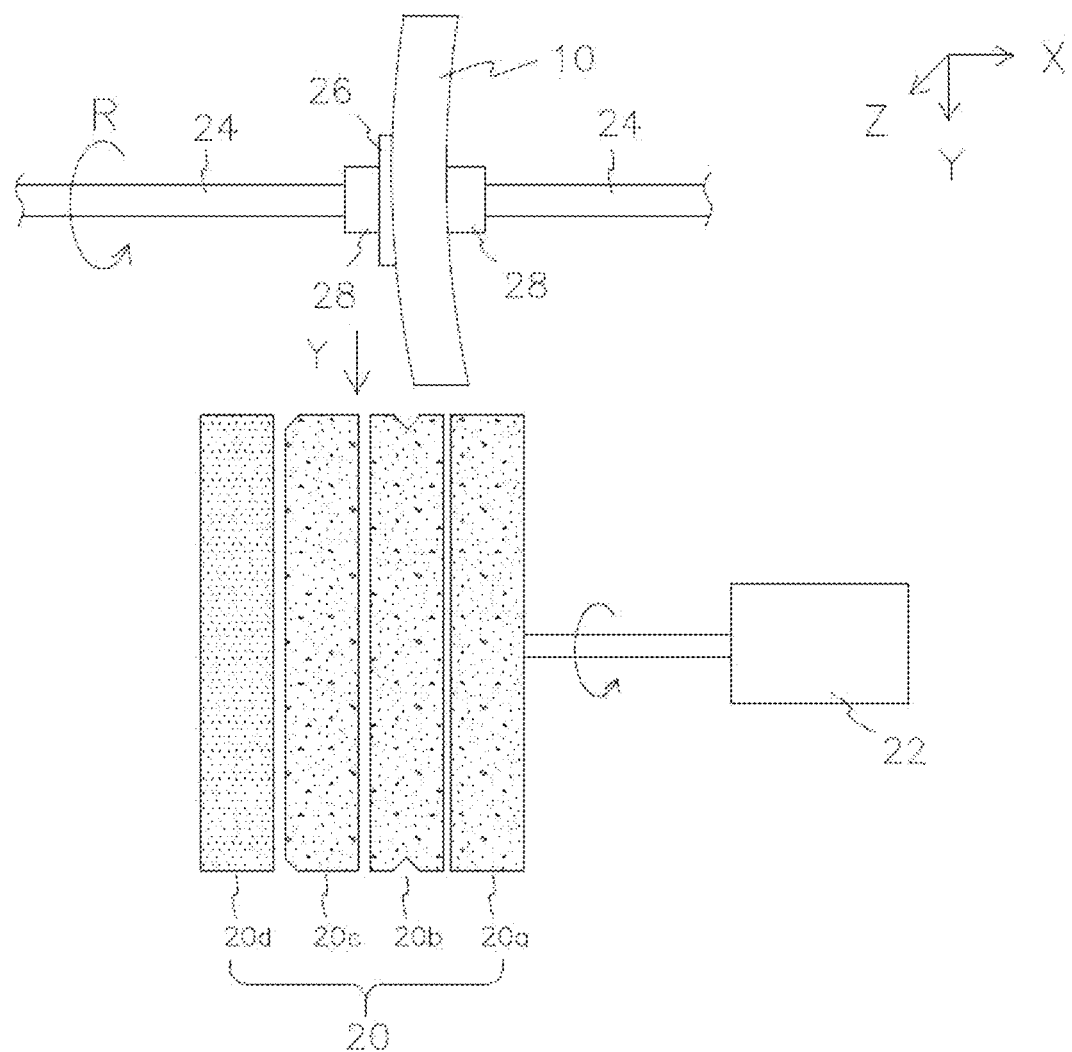

[Figure 2]
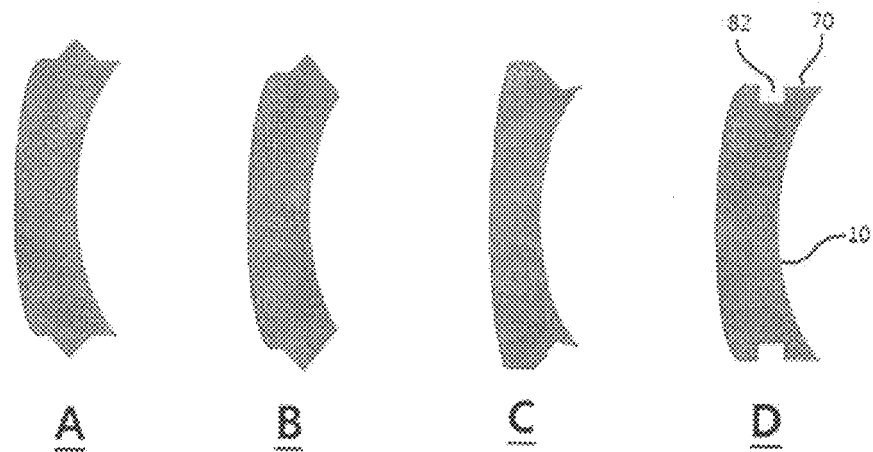
A  B  C  D
[Figure 3]
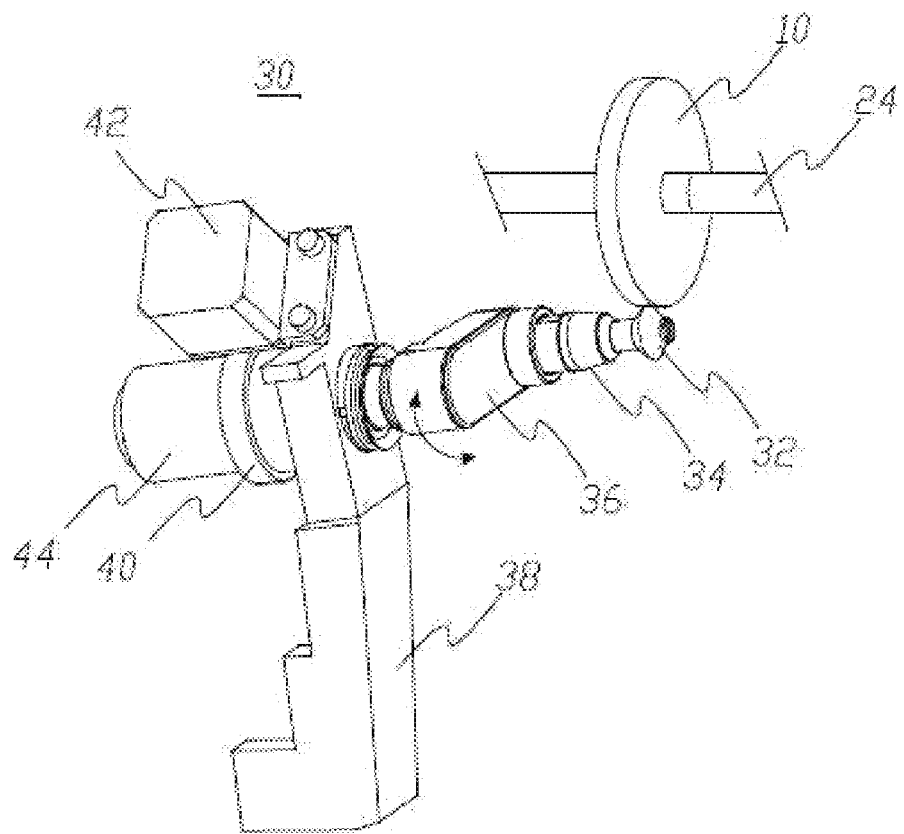

[Figure 4]
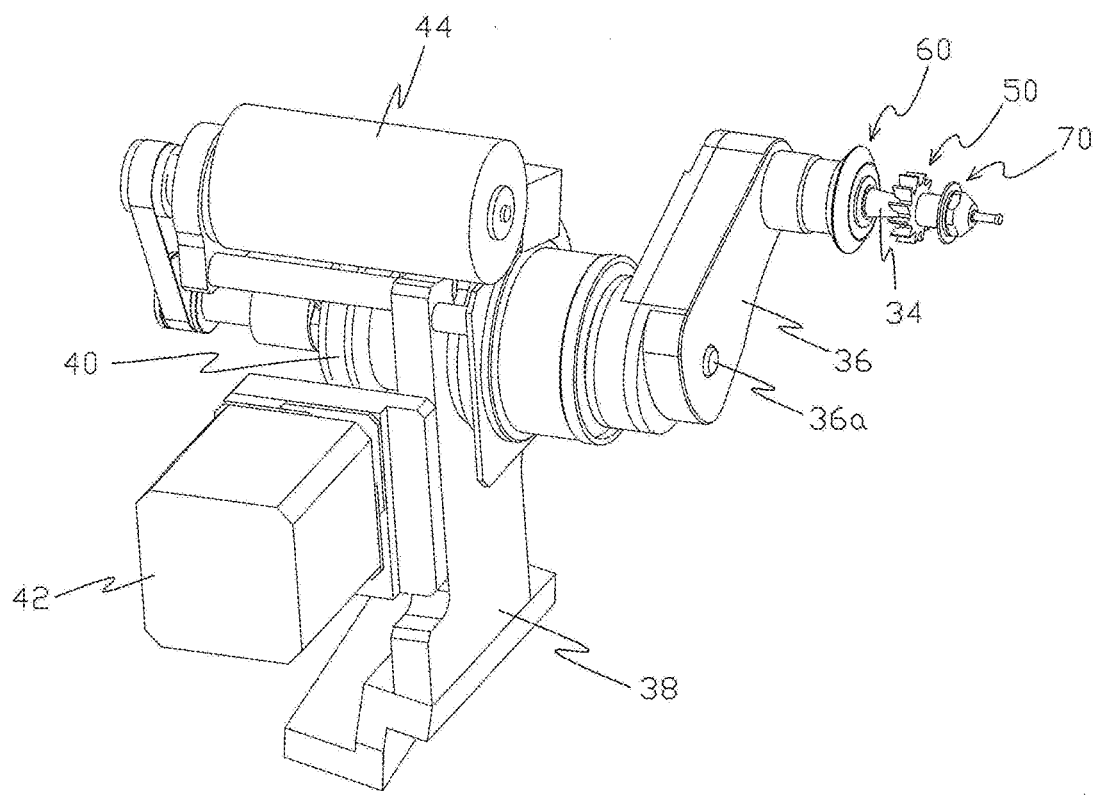
[Figure 5]
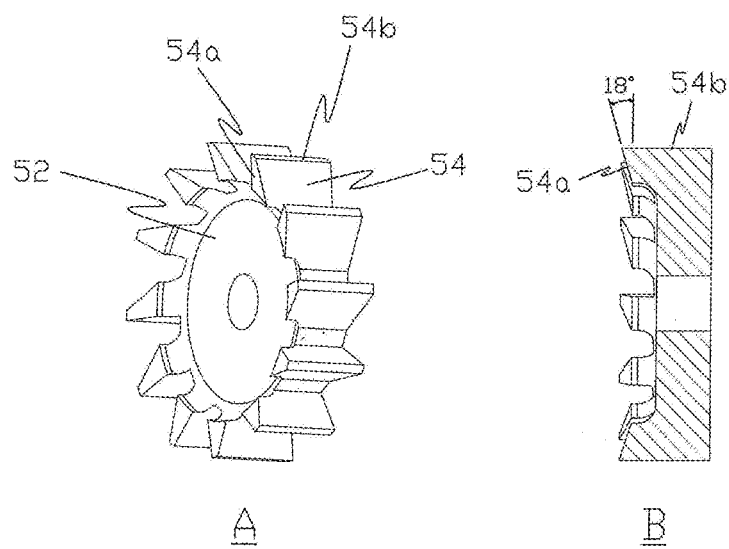
A    B

[Figure 6]
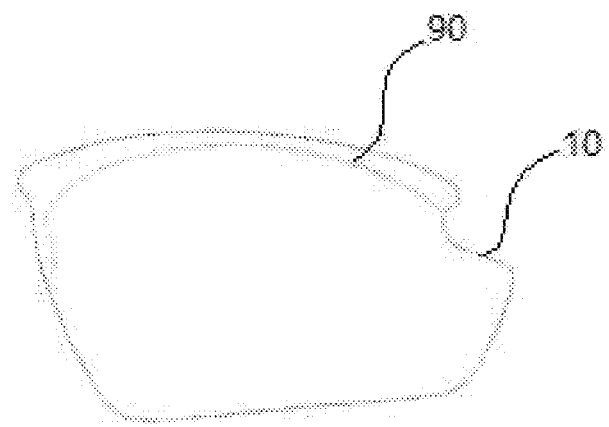
[Figure 7]
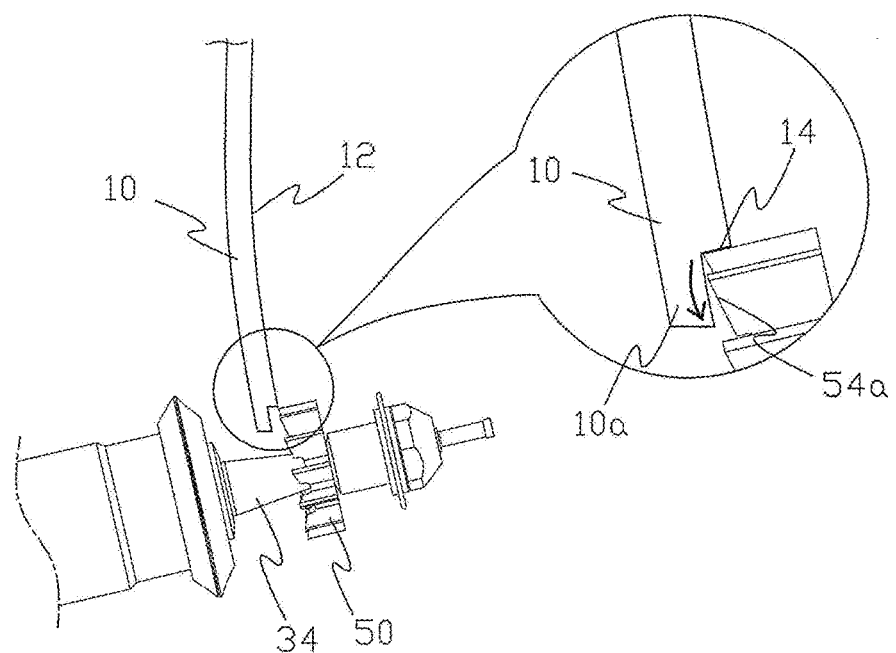

[Figure 8]
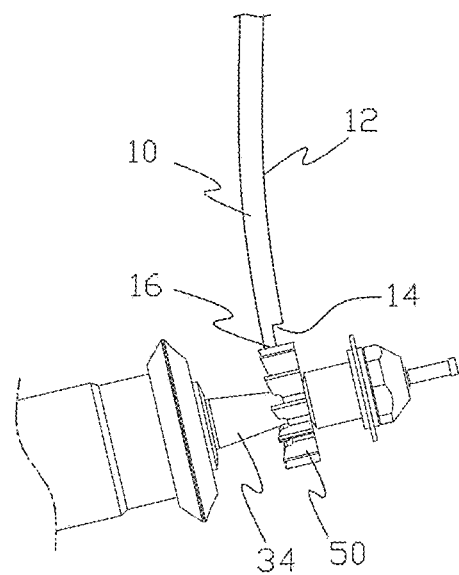
[Figure 9]
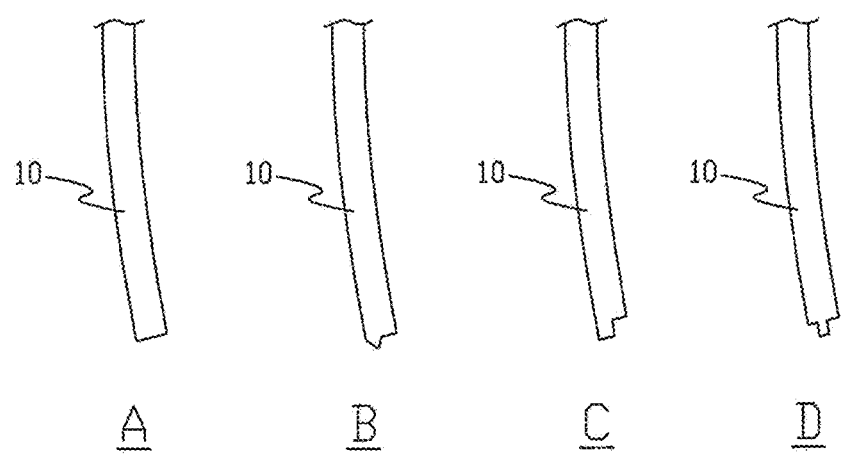
A   B   C   D

APPARATUS FOR PROCESSING EDGE OF EYEGLASS LENS

TECHNICAL FIELD

This invention relates to an apparatus and method for processing eyeglass lens, and more particularly an apparatus and method for processing edge of eyeglass lens into a step shape or an incline shape.

BACKGROUND ART

For manufacturing an eyeglass lens, a commercially available circular lens (usually called as a blank lens) should be processed into an intended shape, for example, a shape in conformity with the configuration of an eyeglass frame. FIG. 1 is a view showing a process of processing a circular lens into an eyeglass lens using a grinder such as a diamond wheel. As shown in FIG. 1, the apparatus for processing eyeglass lens (lens edger) is equipped with a grinder 20 which is rotated by a motor 22, and a circular lens 10 fixed to a clamp 24 is positioned opposite to the grinder 20. The grinder 20 includes a rough-machining grinder wheel 20a, a bevel-machining grinder 20b, an incline-machining grinder 20c, a surface-finishing grinder 20d. The clamp 24 serves to rotate the lens 10 in the R direction and/or to move in Y direction. The apparatus for processing eyeglass lens moves the clamp 24 toward the rough-machining grinder 20a (Y direction in FIG. 1) until the periphery of the lens 10 comes into contacted with the rotating rough-machining grinder 20a, and then the periphery of the lens 10 is grinded. When this grinding and polishing process is performed over the entire periphery of the lens 10 by rotating the lens 10 in R direction (three-axis movement of the lens 10), the lens 10 can be roughly grinded and polished. In FIG. 1, a reference numeral 26 denotes a lens fixing tape, and a reference numeral 28 denotes a lens fixing block, which are used to firmly attach the lens 10 to the clamp 24.

After completing the rough-machining of the eyeglass lens 10 as described above, the lens 10 is fixed to an eyeglass frame, a lens fixing string, etc., and the side surface (edge) of the lens 10 is processed into a shape desired by the user. FIG. 2 is a view showing various shapes at the edge (side surface) of the eyeglass lens processed. As shown in FIG. 2, in order that the entire edge of the eyeglass lens 10 is inserted and fixed in the groove formed in the inside of the eyeglass frame, the edge of the eyeglass lens 10 is processed to have a mountain-shaped portion (/\) (A in FIG. 2, 'bevel-processing'), a mountain-shaped portion and an inclined portion (FIG. 2B), or a flat portion and an inclined portion (FIG. 2C). The bevel-processing denoted by A in FIG. 2 is performed by the bevel-machining grinder 2b which has a groove formed in the circumference thereof (See FIG. 1). For example, the lens 10 roughly processed by the rough-machining grinder 20a is moved so as to be in contact with the bevel-machining grinder 20b. The edge of the lens 10 is polished by the bevel-machining grinder 20b so that a mountain-shaped portion may be formed at the edge of the lens 10. The mountain-shaped portion and an inclined portion shown in B of FIG. 2 can be formed by polishing the edge of the lens 10 with the incline-machining grinder 20c of asymmetric wheel after forming the mountain-shaped portion at the edge of the lens 10 with the bevel-machining grinder 20b (See FIG. 1). The flat portion and an incline portion shown in C of FIG. 2 can be formed by polishing the edge of the lens 10 with the incline-machining grinder 20c after flatting the edge of the lens 10 with the rough-machining grinder 20a.

On the other hand, as shown in D of FIG. 2, the groove 82 (U-shaped) is also formed at the edge of the eyeglass lens 10 ('grooving process'). In the semi-rimless eyeglasses, the lens fixing string or a part or the whole of the eyeglass frame of thin thickness is fitted into the groove 82 to fix the eyeglass lens 10, so that the grooving process is also called 'semi-rimless process'. The 'grooving process' cannot be performed by the large-scale lens processing apparatus shown in FIG. 1, so it is performed by a separate small grinder for grooving (grooving device). FIG. 3 is a perspective view of a conventional grooving device which is additionally mounted onto the lens processing apparatus (see Korean Patent Unexamined-Publication No. 10-2006-0054560). As shown in FIG. 3, the grooving device 30 comprises a wheel 32 for forming a groove (groove-forming wheel) at the edge of the lens 10; a wheel shaft 34 for supporting the groove-forming wheel 32; a wheel-shaft-moving rotating member 36 whose one end is mounted on the wheel shaft 34 and the other end is rotatably mounted on a fixing block 38, for moving the wheel shaft 34; a wheel-moving motor 42 mounted on the fixing block 38, for moving the wheel-shaft-moving rotating member 36 via a worm gear 40; and a wheel-rotating motor 44 for rotating the groove-forming wheel 32 and the wheel shaft 34 at a high speed through a pulley and a belt mounted inside the wheel-shaft-moving rotating member 36. In operation, when the wheel-moving motor 42 is driven, the rotating force of the wheel-moving motor 42 is transmitted through the worm gear 40, to rotate the wheel-shaft-moving rotating member 36 in the direction of the arrow in FIG. 3 so that the groove-forming wheel 32 is moved to a polishing position. Next, the clamp 24 to which the lens 10 is fixed is moved to bring the groove-forming wheel 32 into contact with the edge of the lens 10 and then the groove-forming wheel 32 is rotated, so that a groove 82 having a desired depth is formed in the edge of the lens 10. Thus, the 'grooving process' is performed by the grooving device 30 which is a small grinder with small curvature.

Recently, in accordance with varieties of consumer demands and glasses use, the eyeglass frames and eyeglass lenses having various shapes and curvatures are used. The eyeglasses with special shapes are made for demanding sports or design rather than vision correction (for example, glasses for goggles). Among the eyeglasses with special shapes, there is a case where the conventional processing apparatus may not be able to process the periphery or edge of the eyeglass lens so as to be suitable for the shape of the eyeglass frame. For example, in the case where only a part of the eyeglass lens is irregularly inserted into the eyeglass frame, it is sometimes difficult to precisely process the periphery of the eyeglass lens only by moving the lens in three axes. Alternatively, when the step-processing and bevel-processing are required on the front and rear edge surfaces of the high curve lens of 6 or more curve, the processing axis of the processing apparatus, for example, the wheel shaft 34 should tilt or move freely along the curve of the lens. Therefore, in the processing the lens having edge of such a complicated shape, used is a large-scale processing apparatus (a device for a lab) which is capable of freely moving a grinding device and a wheel shaft. Further, in order to precisely process the edge surface of the eyeglass lens into a step shape, a tool with a small area for polishing must be used, so that a long time is required for processing, and in order to improve the workability, the roughness of the surface to be grinded must be lowered.

DISCLOSURE

Technical Problem

An object of the present invention is to provide an apparatus and method for processing the edge of the eyeglass lens into a step shape and an incline shape without using an expensive large processing apparatus, which can reduce the processing cost and the processing time of the eyeglass lens.

Another object of the present invention is to provide an apparatus and method for simply processing the edge of the high-curve eyeglass lens into a step shape and an incline shape by improving a simple conventional grooving device which has not a function of tilting the processing axis.

Still another object of the present invention is to provide a method for processing the edge of the eyeglass lens which is capable of adjusting the processing degree for a step shape and an incline shape, depending on the curvature of the lens.

Technical Solution

In order to achieve these objects, the present invention provides an apparatus for processing edge of eyeglass lens comprising: a wheel-shaft-moving rotating member 36 whose one end is fixed to a fixing frame by a rotation shaft 36a, for moving pivotally about the rotation shaft 36a; a wheel shaft 34 mounted on the other end of the wheel-shaft-moving rotating member 36, for moving pivotally together with the wheel-shaft-moving rotating member 36 and for being rotated by a driving of a wheel-rotating motor 44; and a cutter 50 for processing the edge of the eyeglass lens into a form of a step shape and an incline shape, wherein the cutter 50 is coupled to one end of the wheel shaft 34 to move together with the wheel shaft 34 so as to contact the edge of the eyeglass lens, and is rotated together with the wheel shaft 34 so as to cut the edge surface of the eyeglass lens, and wherein the cutter 50 comprises a rotating body 52 inserted into the wheel shaft 34 to rotate together with the wheel shaft 34, and at least one cutting teeth 54 formed around a periphery of the rotating body 52 to cut the edge surface and the periphery of the lens.

Also, the present invention provides a method for processing edge of eyeglass lens, which comprises the steps of: pivotally moving a wheel-shaft-moving rotating member 36 pivotally moving with respect to the fixing frame so that a wheel shaft 34 coupled to the wheel-shaft-moving rotating member 36 and the rear cutting surface 54a of the cutter 50 coupled to one end of the wheel shaft 34 is brought into contact with the edge surface of the eyeglass lens; and in a state of rotating the wheel shaft 34 and the cutter 50, moving the eyeglass lens 10 depending on the shape of the eyeglass frame and the curvature of the eyeglass lens 10 and contacting the edge surface of the lens surface 12 of the eyeglass lens 10 with the rear cutting surface 54a of the cutter 50, whereby the edge surface of the lens surface 12 of the lens 10 is cut so that the step shape 14 is formed.

Technical Effects

According to the apparatus and method for processing an eyeglass lens edge according to the present invention, it is possible to reduce the processing cost and the processing time of the eyeglass lens by processing the edge of the eyeglass lens into a stepped or inclined shape without using expensive processing equipment. Further, according to the present invention, it is possible to easily perform the step and the incline process on the edge of the eyeglass lens of the high curve by modifying a conventional grooving device without the tilting function of the processing shaft. Also, according to the present invention, it is possible to adjust the depth of the step and the incline process according to the curvature of the eyeglass lens.

BRIEF DESCRIPTION OF DRAWINGS

FIG. 1 is a view showing a process of processing a circular lens into an eyeglass lens using a grinder.

FIG. 2 is a view showing various forms in the circumference of the eyeglass lens processed.

FIG. 3 is a view showing a conventional grooving device used in a lens processing apparatus.

FIG. 4 is a view showing an apparatus for processing edge surface of eyeglass lens according to an embodiment of the present invention.

FIG. 5 is a view showing a perspective view (A) and a side sectional view (B) of a cutter for forming a step shape and a slope shape in edge surface of the eyeglass lens, which is used in the apparatus for processing edge surface of eyeglass lens according to the present invention.

FIG. 6 is a view showing an eyeglass lens having an irregular-shaped step form, which is formed by the cutter used in the apparatus for processing edge surface of eyeglass lens according to the present invention.

FIG. 7 is a view showing a process of forming a step shape on the side surface of the lens by the processing method according to the present invention.

FIG. 8 is a view showing a process of forming a slope shape on a side surface of the lens by the processing method according to the present invention.

FIG. 9 is a view showing various step shapes and slope shapes formed by the apparatus for processing edge surface of eyeglass lens according to the present invention.

DETAILED DESCRIPTION OF INVENTION

Hereinafter, a more complete appreciation of the invention, and many of the attendant advantages thereof, will be better appreciated by reference to the following detailed description and attached drawings.

An apparatus for processing edge of eyeglass lens according to an embodiment of the present invention is equipped with a cutter for cutting front and rear edges of the lens to form a step shape and a slope shape, besides the grooving device 30 as shown in FIG. 3. FIG. 4 is a view showing the apparatus for processing edge surface of eyeglass lens according to an embodiment of the present invention.

As shown in FIG. 4, the apparatus for processing edge surface of eyeglass lens according to the present invention comprises a wheel-shaft-moving rotating member 36 whose one end is fixed to a fixing frame via a rotation shaft 36a for moving pivotally about the rotation shaft 36a; a wheel shaft 34 mounted on the other end of the wheel-shaft-moving rotating member 36 to move pivotally together with the wheel-shaft-moving rotating member 36, a wheel shaft 34 being rotated by the driving of a wheel-rotating motor 44; and a cutter 50 for processing the lens edge surface in a form of step and slope shapes. The cutter 50 is coupled to one end of the wheel shaft 34 so that it moves together with the wheel shaft 34 to contact the edge surface of the eyeglass lens together with the wheel shaft 34 and rotates together with the wheel shaft 34 to cut the edge surface of the eyeglass lens.

The fixing frame to which one end of the wheel-shaft-moving rotating member 36 is coupled, as a support capable of pivotally moving the wheel-shaft-moving rotating member 36, may be a frame of the apparatus for processing edge surface of eyeglass lens, for example may be a fixing block 38 fixedly mounted on the apparatus for processing edge surface of eyeglass lens. The wheel-shaft-moving rotating member 36 whose one end is rotatably engaged with the fixing frame via the rotation shaft 36a pivotally rotates around the rotation shaft 36a, to make the wheel shaft 34 move toward the eyeglass lens 10 or the wheel shaft 34 be detached from the eyeglass lens 10. On the fixing block 38 is mounted a wheel-moving motor 42 for pivotally moving the wheel-shaft-moving rotating member 36. The rotating force of the wheel-moving motor 42 is transmitted to the wheel-moving member 36 through the worm gear 40 to pivotally move the wheel-shaft-moving rotating member 36. Rotation of the wheel shaft 34 and its associated cutter 50 can be carried out by a wheel-rotating motor 44. For example, the wheel-rotating motor 44 is mounted on the fixing block 38 and a pulley and a belt (not shown) are provided in the wheel-shaft-moving rotating member 36. Then the driving force of the wheel-rotating motor 44 is transmitted via the pulley and belt to the wheel shaft 34 so as to rotate the wheel shaft 34 and the cutter 50 at a high speed.

In the apparatus for processing edge surface of eyeglass lens according to the present invention, the wheel shaft 34 performs only a pivoting two-step rotation movement, reciprocating between a grinding position and a standby position. The grinding position is a position where the wheel shaft 34 is close to the eyeglass lens 10. Specifically, the grinding position is a position at which the wheel shaft 34 is located substantially perpendicular to a surface of the eyeglass lens 10 and the cutter 50 coupled to the wheel shaft 34 are in contact with the edge surface of the eyeglass lens 10 in parallel. The standby position means a position where the cutter 50 is spaced apart from the eyeglass lens 10 for waiting for lens processing. Here, when the curved surface of the eyeglass lens 10 is substantially perpendicular to the wheel shaft 23, the curved surface of the lens 10 and the cutter 50 are positioned substantially parallel to each other. Therefore, the processing of the edge of the eyeglass lens 10 can be efficiently performed by the rotation of the cutter 50. Substantial paralleling of the curved surface of the eyeglass lens 10 to the cutter 50 means that the curved surface of the eyeglass lens 10 and the cutting surface of the cutter 50 are substantially positioned parallel, and also means that at least there is a parallel positional relation such that the curved surface of the eyeglass lens 10 is cut by the rear surface of the cutter 50. This is substantially the same as that the wheel shaft 34 is tiled at a predetermined angle so as to be vertically positioned to the lens 10 in accordance with the curvature of the lens 10 at a grinding position in the conventional grooving device of FIG. 3.

FIG. 5 is a view showing a perspective view (A) and a side sectional view (B) of a cutter for forming a step shape and a slope shape in edge surface of eyeglass lens, which is used in the apparatus for processing edge surface of eyeglass lens according to the present invention. As shown in FIG. 5, the cutter 50 for forming a step shape and a slope shape in edge surface of eyeglass lens comprises a rotating body 52 fitted in the wheel shaft 34 to rotate together with the wheel shaft 34 and at least one cutting teeth 54 formed around the rotating body 52 for cutting the edge surface and the circumference of the lens. At the rear surface of the cutting teeth 54 is formed a rear cutting surface 54a for cutting the edge surfaces of the lens surfaces (front surface and rear surface) contacting the rear surface of the cutting teeth 54. The rear cutting surface 54a is protruded from the rear surface of the rotating body 52 by a predetermined distance, for example, 1 to 10 mm, preferably 2 to 5 mm. Preferably the rear cutting edge surface 54a is inclined about 5 to 45 degrees, preferably 10 to 30 degrees, for example 18 degrees so that its outermost protruding portion has the highest height (See B in FIG. 5). As described above, since the rear cutting surface 54a is protruded from the rear surface of the rotating body 52 with its protrusion height being reduced inwardly, a concave groove is formed at the center by the rear cutting surface 54a. Therefore, with the rear cutting surface 54a it is possible to prevent unnecessary interference and contact between the lens and the rotating body 52 even when cutting the high curvature lens of 6 or more curves. The circular concave groove formed by the rear cutting surface 54a minimizes vibration and noise during lens processing, and improves the quality of the processed surface. Here, the rear surface indicates the direction of the wheel rotating motor 44 that rotates the rotating body 52. On the side surface (side surface) of the cutting teeth 54 is formed a side cutting surface 54b for cutting the side surface of the lens contacting the side surface of the cutting teeth 54 in a slope shape. The cutter 50 for forming a step shape and a slope shape in edge surface of eyeglass lens. In order to smoothly cut the side surface and the circumference of the lens by the high-speed rotation of the cutter 50, a plurality of cutting tooth 54, for example 2 to 30, preferably 6 to 20, and more preferably 8 to 16 are uniformly formed on the circumference of the rotating body 52 and the cutting tooth 54 are made of hard metal. The radius R of the cutter 50 is typically 5 to 30 mm, preferably 8 to 20 mm. If the radius of the cutter 50 is too small, it takes a long time to cut the edge surface of the lens surface. If the radius is too large, fine cutting of the lens surface becomes difficult and cutting errors may occur.

Returning FIG. 4, in the apparatus for processing edge surface of eyeglass lens according to the present invention, the grinding wheel 60 for groove-forming and/or a beveling wheel 70 may be further mounted on the wheel shaft 34. The grinding wheel 60 rotates together with the wheel shaft 53. The grinding wheel 60 is the same device as the groove-forming wheel 32 of FIG. 3 as a conventional grinding apparatus for forming concave grooves 82 (see D in FIG. 2) on the circumference of the eyeglass lens 10 by friction against the circumference (side surface) of the eyeglass lens 10. The grinding wheel 60 has a tapered disk shape whose thickness decreases toward the end and a grinding blade is formed on the peripheral (side) end of the grinding wheel 60. When the grinding blade is in contact with the periphery of the eyeglass lens 10 in a state of rotating, a flat surface 70 in the circumference of the eyeglass lens 10 may be grinded and a groove 82 may be formed on the circumference (side surface) of the eyeglass lens 10 (see FIG. 2). The beveling wheel 70 rotates together with the wheel shaft 34 and grinds the circumference (side) or edge surface of the eyeglass lens 10 to form a flat grinded surface at the circumference or edge surface of the eyeglass lens 10. As shown in FIG. 4, it is preferable that the groove-forming grinding wheel 60, the cutter 50 and the beveling wheel 70 are sequentially located on the wheel shaft 34. It is preferable that the cutter 50 are located on the outer side (front surface) of the wheel shaft 34 considering a processing depth in lens with more than 6 curves and in the step-forming process. The cutter 50 can be appropriately arranged according to the step height, the curvature and thickness of the lens, and the like.

FIG. 6 is an illustration of an example of an eyeglass lens in which an irregular step-shape is formed by the cutter 50 in the apparatus for processing edge surface of eyeglass lens of the present invention. In a special type sports eyeglass lens 10 as shown in FIG. 6, a portion denoted by reference numeral 90 is a portion where the eyeglass frame is fitted. In order to insert and fix the eyeglass lens 10 in the eyeglass frame, the edge surface of the eyeglass lens 10 must be stepped-processed along the irregular shape indicated by the reference numeral 90. Such irregularly shaped step processing can be performed by using the cutter 50 of the present invention while it cannot be practically performed by the conventional grinder 20 and the groove-forming wheel 32. Generally, the front curvature of the eyeglass lens is less than or equal to 4 curves, and the curvature of the rear surface usually has 4 to 6 curves depending on the dioptric power of the lens. The sports eyeglass lens 10 as shown in FIG. 6 is generally made of a difficult-to-cut material, such as polycarbonate or Trivex, and has a high curvature of 6 or more curves. Accordingly, in a step-processing of lens 10 having hardness and high curvature as shown in FIG. 6, the cutter 50 of the present invention having a small diameter and performing cutting processing should be used.

FIG. 7 is a view showing a process of forming a step shape on the side surface of the lens by the processing method according to the present invention. In order to form the step shape on the edge surface of the eyeglass lens using the apparatus for processing eyeglass lens, as shown in FIG. 7, firstly, the wheel-shaft-moving rotating member 36 (see FIG. 4), which is pivotally moved with respect to the fixing frame, is pivotally moved. A wheel shaft 34 which is coupled to the wheel-shaft-moving rotating member 36 and the cutter 50 for forming a step shape and a slope shape which is coupled to one end of the wheel shaft 34 are moved to the grinding position. Thus, the rear cutting surface 54a of the cutter 50 is brought into contact with the edge surface of the eyeglass lens 10. Next, in a state of rotating the wheel shaft 34 and the cutter 50 at a high speed, the eyeglass lens 10 is moved depending on the shape of the eyeglass frame and the curvature of the eyeglass lens 10 and the edge surface of the lens surface 12 of the eyeglass lens 10 is brought into contact with the rear cutting surface 54a of the cutter 50. Whereby the edge surface of the lens surface 12 of the eyeglass lens 10 is cut so that the step shape 14 is formed.

In the cutter 50 according to the present invention, since the rear cutting surface 54a thereof is protruded, a concave groove portion is formed inside in a form of "]" in view of the cutting tool. Therefore, even when the step-processing is performed on the eyeglass lens 10 of high curve, the step shape 14 can be formed along the curved surface of the eyeglass lens 10 without a disturbance by the other portion 10a of the eyeglass lens 10, that is, in state in which the interference between the eyeglass lens 10 and the cutter 50 is minimized. In the processing for forming the step shape 14, the curvature and thickness of the eyeglass lens 10, the shape and position of the rear cutting surface 54a are three-dimensionally simulated. According to the algorithm in which the interference between the eyeglass lens 10 and the cutter 50 is minimized and the curvature of the eyeglass lens 10, the rear cutting surface 54a is moved (in the direction of the arrow in FIG. 7), to form the step shape 14 that is the same as the curve shape of the eyeglass lens 10. That is, the step shape 14 can be formed while the eyeglass lens 10 moves in a radial direction (arrow direction in FIG. 7) along the curved surface of the eyeglass lens 10. There-fore, a step shape can be formed in the eyeglass lens 10 having various curvatures by using one cutter 50.

As described above, when a part of the edge surface of the lens surface 12 of the eyeglass lens 10 is cut, the eyeglass lens 10 is moved along the irregular shape 90 shown in FIG. 6 so that the step shape 14 is continuously formed at the position where the eyeglass frame is to be fitted. At this time, depending on the curvature and thickness of the eyeglass lens 10, the cutting depth and the step of the rear cutting surface 54a can be adjusted. It is also possible to adjust the cutting depth and the step of the cutting edge surface 54a according to respective position of each lens. For example, in the 6 and 12 o'clock directions of the lens 10 the cutting depth can be set to be 1 mm and in the 3 and 9 o'clock directions the cutting depth can be set to be 2 mm, which can be set differently depending on the eyeglass frame into which the lens 10 is inserted. Further, for each position where the step shape 14 is formed, the 3D simulation process is repeated to secure an algorithm in which the interference between the eyeglass lens 10 and the cutter 50 is minimized and with the algorithm the step shape 14 can be continuously formed on the circumference of the eyeglass lens 10. For example, three points A, B, and C are continuously machined in the following manner: first at the position A, the amount of wheel interference is calculated, the lens is processed accordingly; at the B position, the lens is processed by the amount excluding the interference amount by the A position (the amount of processing at the B position is decreased); and at the position C, the lens is processed by the amount excluding the interference amount at the position B (the amount of processing at the position C is decreased). Therefore, the step shape 14 can be formed by an algorithm in which the interference between the eyeglass lens 10 and the cutter 50 is minimized.

FIG. 8 is a view showing a process of forming a slope shape on a side surface of the lens by the processing method according to the present invention. In order to form the sloped shape on the edge surface of the eyeglass lens by using the apparatus for processing the eyeglass lens of the present invention, as shown in FIG. 8, first, in a state of rotating the cutter 50 at a high speed, the eyeglass lens 10 processed in the shape of the eyeglass frame is moved to be contacted with the side cutting surface 54b of the cutter 50 so that the circumference 16 of the eyeglass lens 10 is cut. That is, the side cutting surface 54b cuts the outer frame 16 of the eyeglass lens 10 inserted into the eyeglass frame so that the shape of the eyeglass lens 10 exactly matches the eyeglass frame, and then the peripheral shape of the eyeglass lens 10 is processed so as to be easily inserted. As described above, when a part of the periphery 14 of the eyeglass lens 10 is cut to form a tilted shape, the eyeglass lens 10 is moved along the irregular shape 90 shown in FIG. 6 so that the inclined shape is entirely formed at the position where the eyeglass frame is to be fitted. FIG. 9 is a view showing various step shapes and slope shapes formed by the apparatus for processing edge surface of eyeglass lens according to the present invention. As shown in FIG. 9 The eyeglass lens edge surface processing apparatus according to the present invention enables various processing such as a rimless processing (A in FIG. 9), a bevel processing (B in FIG. 9), step-bevel processing (C in FIG. 9), T-bevel processing (D in FIG. 9).

Generally, to process a step or a slope shape at a periphery or edge surface of the eyeglass lens 10 whose rear curvature is 6 curves or more, used in a glass such as a sunglass or goggle, a grinding device whose tilting angle is freely changed according to the curvature of the lens should be used. For changing the tilting angle of the grinding apparatus, joints for additional movement should be formed in the grinding device. On the other hand, the step and slant cutter 50 according to the present invention enables several types of step and slant processing to be performed on the lens edge surface having a curvature of 6 curves or more without changing the slope angle of the wheel shaft 34. Further, in the apparatus for processing edge surface of eyeglass lens according to the present invention, the cutter 50 and the groove-forming polishing wheel 60 are located on the same wheel shaft 34, so that the cutter 50 is driven on a processing shaft of a conventional grooving device and it is possible to perform the step and the slope processing more efficiently in conjunction with the grooving of the eyeglass lens.

The invention claimed is:

1. An apparatus for processing edge of eyeglass lens comprising:
   a wheel-shaft-moving rotating member whose one end is fixed to a fixing frame by a moving shaft, for moving pivotally about the moving shaft;
   a wheel shaft mounted on another end of the wheel-shaft-moving rotating member, for moving pivotally together with the wheel-shaft-moving rotating member and for being rotated by a driving of a wheel-rotating motor; and
   a cutter for processing an edge surface of the eyeglass lens into a form of a step shape and an incline shape,
   the cutter being coupled to one end of the wheel shaft to move together with the wheel shaft so as to contact the edge surface of the eyeglass lens, and being rotated together with the wheel shaft so as to cut the edge surface of the eyeglass lens, and
   wherein the cutter comprises a rotating body mounted on the wheel shaft to rotate together with the wheel shaft, and at least one cutting tooth formed around a periphery of the rotating body to cut the edge surface and the periphery of the lens; and
   wherein on a rear surface of the at least one cutting tooth is formed a rear cutting surface protruded from a rear surface of the rotating body for cutting the edge surface of the lens contacting the rear surface of the at least one cutting tooth, and on a side surface of the at least one cutting tooth is formed a side cutting surface for cutting the edge surface of the lens contacting the side surface of the at least one cutting tooth in a form of the incline shape.

2. The apparatus of claim 1, wherein the wheel shaft reciprocates between a grinding position where the cutter contacts the edge surface of the eyeglass lens in parallel and a standby position where the cutter is spaced apart from the eyeglass lens for waiting for a lens processing.

3. The apparatus of claim 1, wherein the rear cutting surface is inclined about 5 to 45 degrees so that an outermost protruding portion thereof has a maximum vertical height.

4. The apparatus of claim 1, wherein the number of the cutting teeth is between 8 and 16, the cutting teeth being uniformly spaced on the circumference of the rotating body.

5. The apparatus of claim 1, wherein the wheel shaft is further provided with a polishing wheel adapted for forming a concave groove at the edge of the eyeglass lens by friction with the edge of the eyeglass lens.

\* \* \* \* \*